US012521847B2

(12) United States Patent
Banholzer et al.

(10) Patent No.: US 12,521,847 B2
(45) Date of Patent: *Jan. 13, 2026

(54) RATCHETING TOOL

(71) Applicant: MILWAUKEE ELECTRIC TOOL CORPORATION, Brookfield, WI (US)

(72) Inventors: Hans T. Banholzer, Mequon, WI (US); Jonathan Paul, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 410 days.

This patent is subject to a terminal disclaimer.

(21) Appl. No.: 18/156,028

(22) Filed: Jan. 18, 2023

(65) Prior Publication Data

US 2023/0150097 A1 May 18, 2023

Related U.S. Application Data

(63) Continuation of application No. 17/513,642, filed on Oct. 28, 2021, now Pat. No. 11,565,386.

(60) Provisional application No. 63/126,033, filed on Dec. 16, 2020, provisional application No. 63/106,690, filed on Oct. 28, 2020.

(51) Int. Cl.
*B25B 21/00* (2006.01)

(52) U.S. Cl.
CPC .................................. *B25B 21/004* (2013.01)

(58) Field of Classification Search
CPC ... B25B 13/463; B25B 13/465; B25B 13/461; B25B 13/462; B25B 13/48; B25B 21/004
USPC ................................................. 81/54, 57, 58
See application file for complete search history.

(56) References Cited

U.S. PATENT DOCUMENTS 2,711,111 A * 6/1955 Brame .................. B25B 21/004 81/63
2,719,446 A * 10/1955 Ford ..................... B25B 21/004 81/57.39
6,282,990 B1 9/2001 Miner
6,318,215 B1 * 11/2001 Armfield, IV ........ B25B 13/463 81/58.2

(Continued)

FOREIGN PATENT DOCUMENTS

GB 2512207 A * 9/2014 ........... B25B 21/004
JP 2006515916 A 6/2006

OTHER PUBLICATIONS

International Search Report and Written Opinion for Application No. PCT/US2021/057102 dated Feb. 21, 2022 (10 pages).

*Primary Examiner* — Monica S Carter
*Assistant Examiner* — Kent N Shum
(74) *Attorney, Agent, or Firm* — Michael Best & Friedrich LLP

(57) ABSTRACT

A powered ratchet tool including a housing and a drive mechanism for driving an output member. The drive mechanism includes a yoke through which the output member extends. The ratchet tool further comprises a first selective pawl, a second selective pawl, and a non-selective pawl in the yoke that are biased toward an outer toothed surface of the output member. The outer toothed surface includes first and second selectively-toothed sections. When the first selectively-toothed section and second selectively-toothed sections are rotationally aligned with the with the first selective pawl and the second selective pawl, the first and second selective pawls are incapable of transferring torque to the output member.

19 Claims, 7 Drawing Sheets

(56) References Cited

U.S. PATENT DOCUMENTS

| | | | | |
|---|---|---|---|---|
| 8,875,404 | B2 | 11/2014 | Scott et al. | |
| 11,565,386 | B2 * | 1/2023 | Banholzer | B25B 21/004 |
| 2003/0080703 | A1 * | 5/2003 | Elliott | B25B 21/002<br>318/432 |
| 2011/0005083 | A1 * | 1/2011 | Scott | B23D 17/02<br>30/92 |
| 2012/0186400 | A1 | 7/2012 | Elger | |
| 2013/0036874 | A1 * | 2/2013 | Chan | B25B 21/004<br>81/60 |
| 2014/0182420 | A1 | 7/2014 | Chen et al. | |
| 2019/0022832 | A1 * | 1/2019 | Jensen | B25B 13/463 |
| 2020/0130150 | A1 | 4/2020 | Nick et al. | |
| 2021/0205969 | A1 * | 7/2021 | Zhu | B25C 1/06 |

* cited by examiner

RATCHETING TOOL

CROSS-REFERENCE TO RELATED APPLICATIONS

This application is a continuation of U.S. patent application Ser. No. 17/513,642 filed on Oct. 28, 2021, now U.S. Pat. No. 11,565,386, which claims priority to U.S. Provisional Patent Application No. 63/126,033 filed on Dec. 16, 2020, and U.S. Provisional Patent Application No. 63/106,690 filed on Oct. 28, 2020, the entire contents of all of which are incorporated herein by reference.

FIELD OF THE INVENTION

The present invention relates to ratchet tools, and more particularly to powered ratcheting tools.

BACKGROUND OF THE INVENTION

Powered ratchet tools sometimes allow an operator to drive an output member in a forward direction or an opposite reverse direction to apply torque to a fastener for tightening or loosening the fastener. Powered ratchet tools are typically powered by an electrical source, such as a DC battery, a conventional AC source, or pressurized air. Powered ratchet tools are constructed of components such as a drive mechanism including a motor and an output member for applying torque to the fastener.

SUMMARY OF THE INVENTION

The present invention provides, in one aspect, a powered ratchet tool comprising a housing and an output member having an inner opening, an outer toothed surface, and an output member aperture extending through the outer toothed surface to the inner opening. The powered ratchet tool further comprises a drive mechanism for driving the output member. The drive mechanism includes a yoke in which the output member is arranged. The yoke has a yoke aperture. The powered ratchet tool further comprises a first selective pawl in the yoke that is biased toward the outer toothed surface of the output member, a second selective pawl in the yoke that is biased toward the outer toothed surface of the output member, a non-selective pawl in the yoke that is biased toward the outer toothed surface of the output member, and a blocking member configured to move between an operating position, in which the non-selective pawl is engaged with the outer toothed surface of the output member, and a home position, in which the blocking member inhibits the non-selective pawl from engaging with the outer toothed surface of the output member. The outer toothed surface includes a first selectively-toothed section and a second selectively toothed section. When the first selectively-toothed section is rotationally aligned with the first selective pawl, the first selective pawl is incapable of transferring torque to the output member. When the second selectively-toothed section is rotationally aligned with the second selective pawl, the second selective pawl is incapable of transferring torque to the output member. When the output member is in a home position, the first selectively-toothed section is rotationally aligned with the first selective pawl, the second selectively-toothed section is rotationally aligned with the second selective pawl, and the output member aperture is aligned with the yoke aperture.

The present invention provides, in another aspect, a powered ratchet tool comprising a housing and an output member having an inner opening, an outer toothed surface, and an output member aperture extending through the outer toothed surface to the inner opening. The powered ratchet tool further comprises a drive mechanism for driving the output member. The drive mechanism includes a yoke in which the output member is arranged. The yoke has a yoke aperture. The powered ratchet tool further comprises a first selective pawl in the yoke that is biased toward the outer toothed surface of the output member, a second selective pawl in the yoke that is biased toward the outer toothed surface of the output member, a first non-selective pawl in the yoke that is biased toward the outer toothed surface of the output member, and a second non-selective pawl in the yoke that is biased toward the outer toothed surface of the output member. The powered ratchet tool further comprises a collar configured to move between an operating position, in which the first and second non-selective pawls are engaged with the outer toothed surface of the output member and the collar inhibits the first and second selective pawls from engaging with the outer toothed surface of the output member, and a home position, in which the first and second selective pawls are engaged with the outer toothed surface of the output member and the collar inhibits the first and second non-selective pawl from engaging with the outer toothed surface of the output member. The outer toothed surface includes a first selectively-toothed section and a second selectively-toothed section. When the first selectively-toothed section is rotationally aligned with the first selective pawl, the first selective pawl is incapable of transferring torque to the output member. When the second selectively-toothed section is rotationally aligned with the second selective pawl, the second selective pawl is incapable of transferring torque to the output member. When the output member is in a home position, the first selectively-toothed section is rotationally aligned with the first selective pawl, the second selectively-toothed section is rotationally aligned with the second selective pawl, and the output member aperture is aligned with the yoke aperture.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
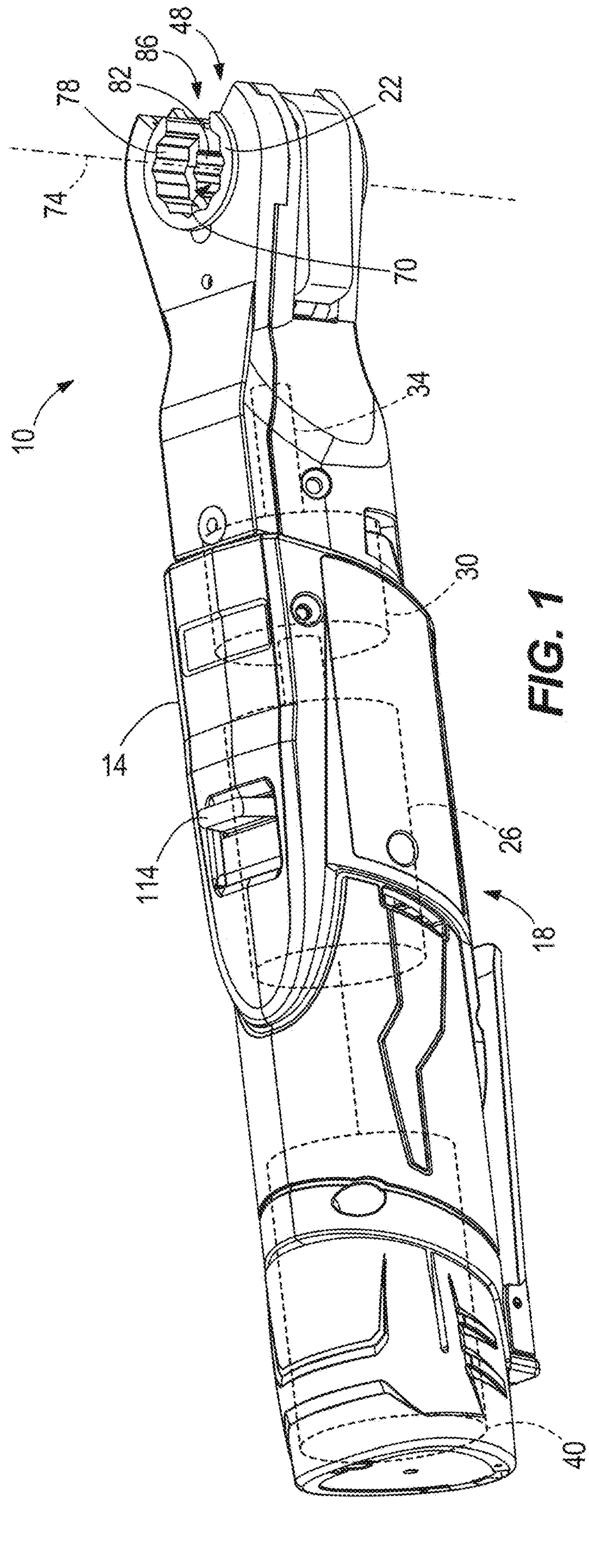
FIG. 1 is a perspective view of a ratchet tool in accordance with an embodiment of the invention.
Figure 2:
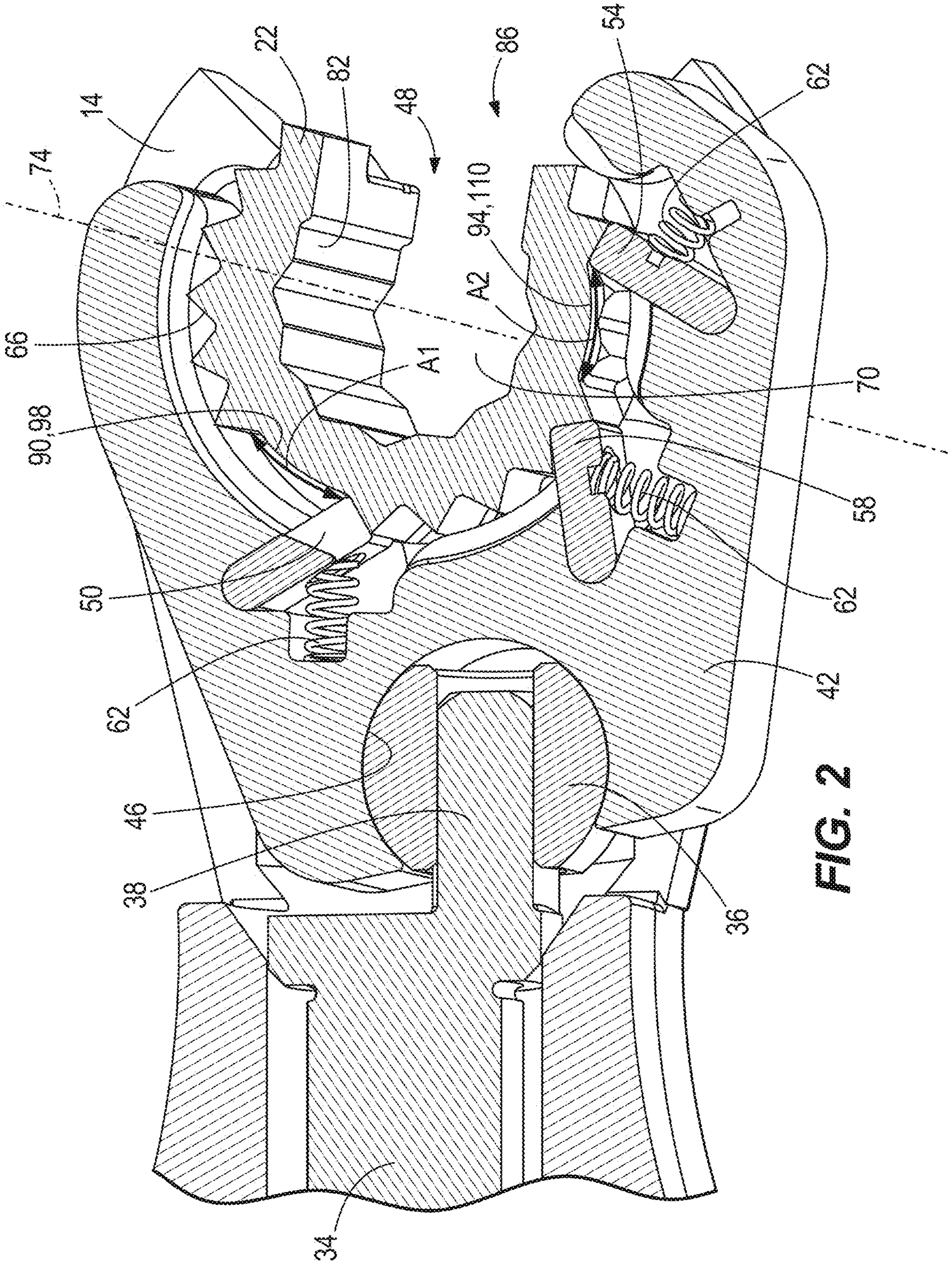
FIG. 2 is a cross-sectional view of the ratchet tool of FIG. 1.

A shown in FIG. 1, a powered ratchet tool 10 includes a housing 14 and a drive mechanism 18 for driving an output member 22, such as a socket driver used to tighten or loosen fasteners (e.g., nuts or bolts). As shown in FIG. 1, the drive mechanism 18 includes a motor 26 and a transmission 30 terminating in a crankshaft 34 (all shown schematically in FIG. 1). As shown in FIG. 2, the crankshaft 34 has a drive bushing 36 arranged eccentrically on an end 38 of the crankshaft 34. The motor 26 is powered by a removable and rechargeable battery pack 40. The drive mechanism 18 also includes a yoke 42 through which the output member 22 extends. The yoke 42 has a recess 46 (FIG. 2) in which the drive bushing 36 is arranged and a yoke aperture 48 giving the yoke 42 a C-shape. As explained in further detail below, when the crankshaft 34 rotates, the drive bushing 36 pivots the yoke 42 in a reciprocating manner, relative to the housing 14, to drive the output member 22.

Figure 3:
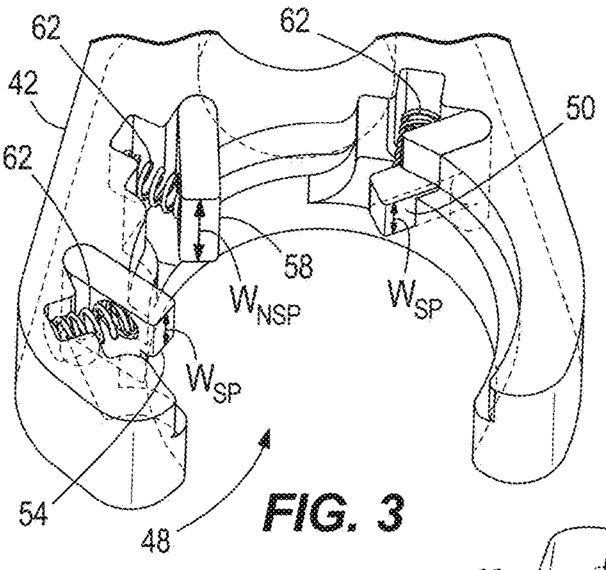
FIG. 3 is a perspective view of a yoke of the ratchet tool of FIG. 1, with portions removed.
Figure 4:
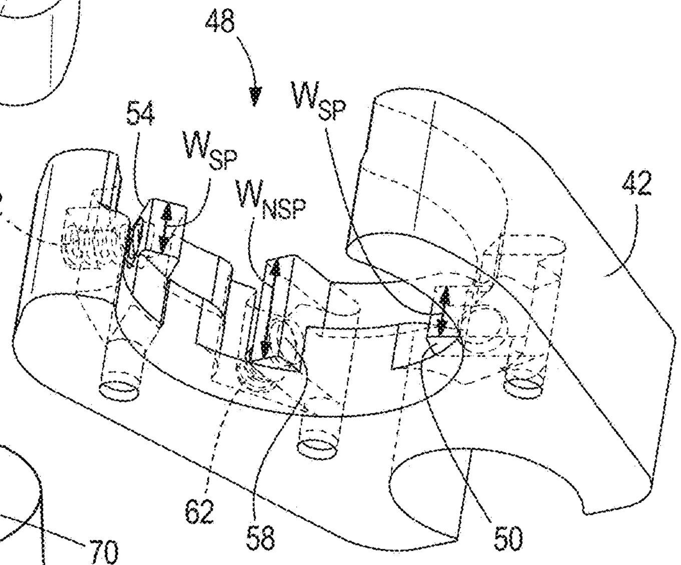
FIG. 4 is a perspective view of a yoke of the ratchet tool of FIG. 1, with portions removed.

With reference to FIGS. 2-4, the ratchet tool 10 also includes a first selective pawl 50, a second selective pawl 54, and a non-selective pawl 58 in the yoke 42. Thus, in the illustrated embodiment, there are three total pawls, but in other embodiments, there may be more than three pawls. The non-selective pawl 58 is arranged in the yoke 42 between the first and second selective pawls 50, 54. The first and second selective pawls 50, 54, as well as the non-selective pawl 58, are each biased by springs 62, respectively, toward an outer toothed surface 66 of the output member 22. The output member 22 also has an inner opening 70 defining a longitudinal axis 74. The non-selective pawl 58 has a width $W_{NSP}$ (FIGS. 3 and 4) that substantially spans a width $W_{TS}$ of the toothed surface 66 (FIG. 5) in a direction parallel to the longitudinal axis 74, whereas the first and second selective pawls 50, 54 each have a width $W_{SP}$ that spans less than the width $W_{TS}$ of the toothed surface 66 in a direction parallel to the longitudinal axis 74. The inner opening 70 includes a first end section 78 (FIG. 1) with a first size and a first shape, such as a 12-point double hexagon shape, and a second end section 82 with a second size and a second shape. However, in other embodiments, the first shape can be something other than a 12-point double hexagon shape.

In the illustrated embodiment, the second size is smaller than the first size and the second shape is also a 12-point double hexagon shape, but in other embodiments, the second size can be smaller and the second shape can be different than the first shape. The first end section 78 is configured to receive a fastener or an insert having a corresponding shape and size. Likewise, the second end section 82 is configured to receive a fastener or an insert having a corresponding shape and size. In some embodiments, the first size is the same as the second size and the first shape is the same as the second shape.

Figure 6:
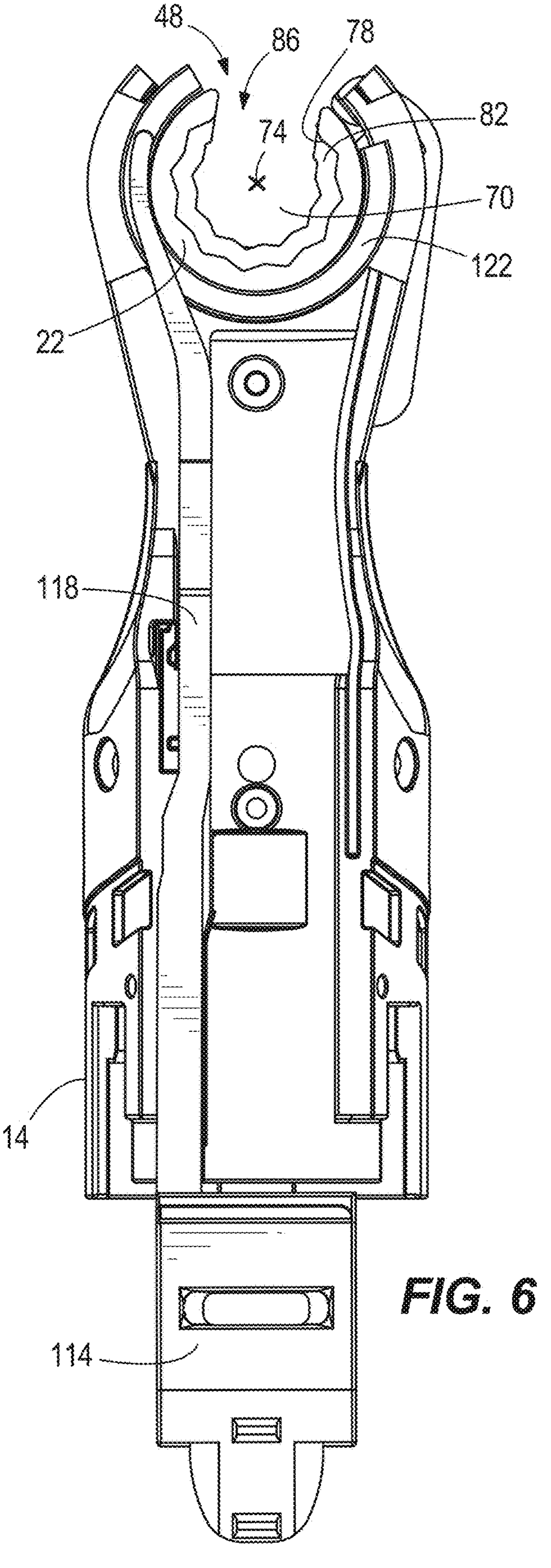
FIG. 6 is a plan view of a ratchet tool of FIG. 1, with portions removed.

The output member 22 also includes an output member aperture 86 extending through the outer toothed surface 66 to the inner opening 70. As shown in FIGS. 1 and 6, when the output member 22 is in a "home" position, the output member aperture 86 is aligned with the yoke aperture 48, creating a passage allowing a fastener or nut to be moved horizontally (i.e., transverse to the axis 74) through the apertures 48, 86 and into the inner opening 70 of the output member 22.

Figure 5:
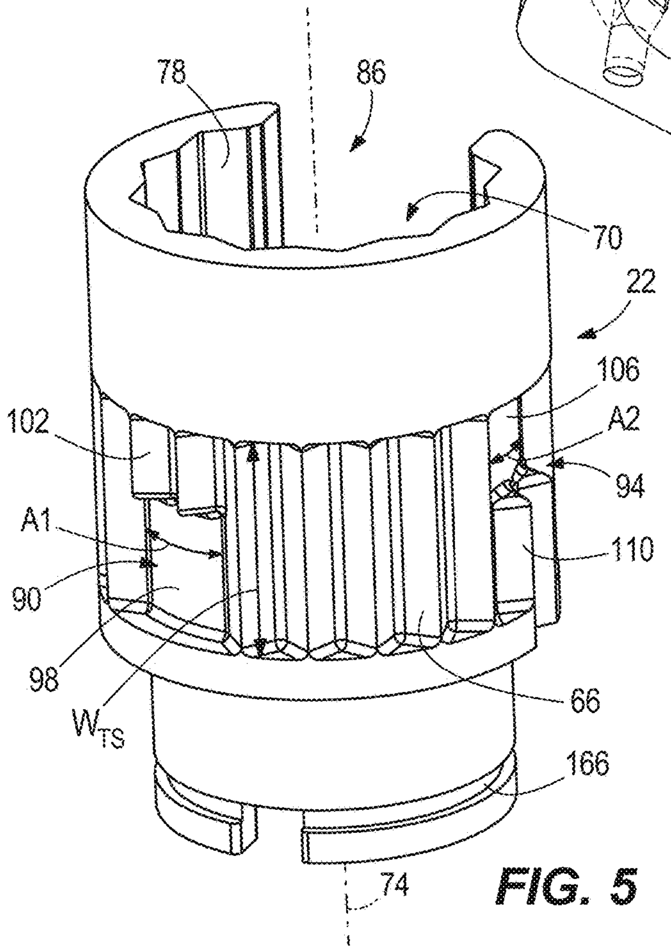
FIG. 5 is a perspective view of an output member of the ratchet tool of FIG. 1.

As shown in FIG. 5, the outer toothed surface 66 includes a first selectively-toothed section 90 along a first outer arc length A1 of output member 22 and a second selectively-toothed section 94 along a second outer arc length A2 of output member 22. The first selectively-toothed section 90 includes a first non-toothed section 98 that is longitudinally aligned with the first selective pawl 50, with respect to the longitudinal axis 74. The first selectively-toothed section 90 also includes a first toothed section 102 that is not longitudinally aligned with the first selective pawl 50, with respect to the longitudinal axis 74. Thus, when the first selectively-toothed section 90 is rotationally aligned with the first selective pawl 50, the first selective pawl 50 is unable to transfer torque to the output member 22 via the outer toothed surface 66 (as described in further detail below), because the first selective pawl 50 is arranged in the first non-toothed section 98 and does not engage the first toothed section 102. However, when the first selectively-toothed section 90 is rotationally aligned with either of the second selective pawl 54 and the non-selective pawl 58, the second selective pawl 54 and the non-selective pawl 58 can transfer torque to the output member 22 via the outer toothed surface 66 (as described in further detail below), because the second selective pawl 54 and the non-selective pawl 58 engage with the first toothed section 102, which is longitudinally aligned with both of the second selective pawl 54 and the non-selective pawl 58, with respect to the longitudinal axis 74.

With continued reference to FIG. 5, the second selectively-toothed section 94 includes a second non-toothed section 106 that is longitudinally aligned with the second selective pawl 54, with respect to the longitudinal axis 74. The second selectively-toothed section 94 also includes a second toothed section 110 that is not longitudinally aligned with the second selective pawl 54, with respect to the longitudinal axis 74. Thus, when the second selectively-toothed section 94 is rotationally aligned with the second selective pawl 54, the second selective pawl 54 is unable to transfer torque to the output member 22 via the outer toothed surface 66 (as described in further detail below), because the second selective pawl 54 is arranged in the second non-toothed section 106 and does not engage the second toothed section 110. However, when the second selectively-toothed section 94 is rotationally aligned with either of the first selective pawl 50 and the non-selective pawl 58, the first selective pawl 50 and the non-selective pawl 58 can transfer torque to the output member 22 via the outer toothed surface 66 (as described in further detail below), because the first selective pawl 50 and the non-selective pawl 58 engage with the second toothed section 110, which is longitudinally aligned with both of the first selective pawl 50 and the non-selective pawl 58, with respect to the longitudinal axis 74.

Figure 7:
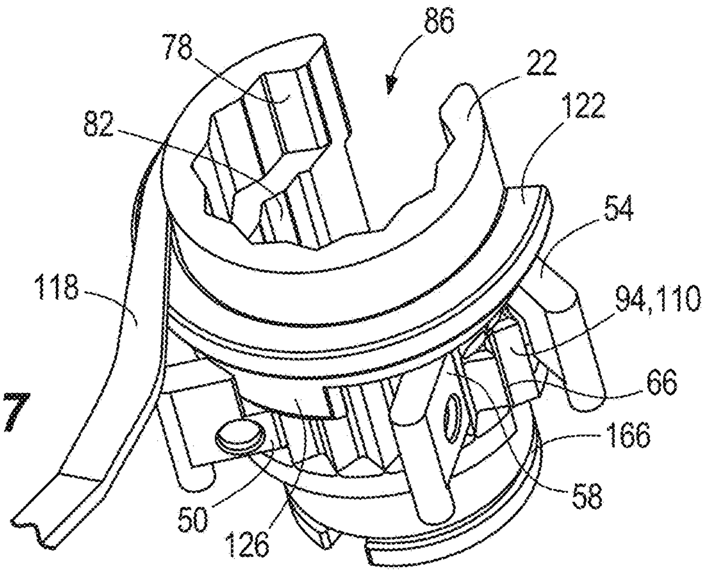
FIG. 7 is a perspective view of the ratchet tool of FIG. 1, with portions removed and a collar in an operating position.

As shown in FIGS. 1 and 6, the ratchet tool 10 includes a home actuator 114 that is coupled, via a linkage 118, to a collar 122 that is arranged in the housing 14 and rotatable relative thereto, as explained in further detail below. In the illustrated embodiment, the home actuator 114 is a slide actuator that is movable between an operating position and a home position. When the home actuator 114 is in the operating position, the linkage 118 and collar 122 are in operating positions shown in FIG. 6, in which a blocking member 126 of the collar 122 is not rotationally aligned with the non-selective pawl 58 (FIG. 7).

Figure 8:
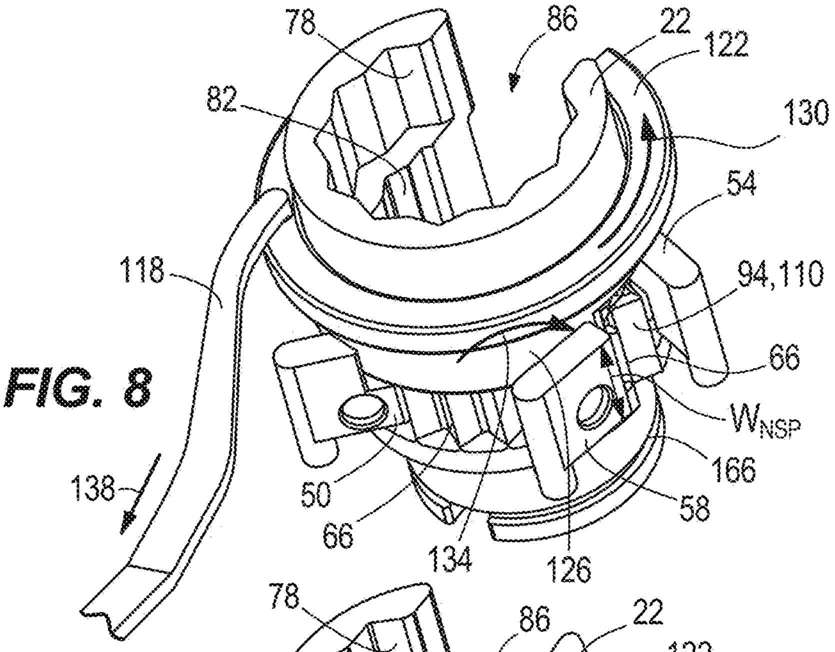
FIG. 8 is a perspective view of the ratchet tool of FIG. 1, with portions removed and a collar in a home position.
Figure 9:
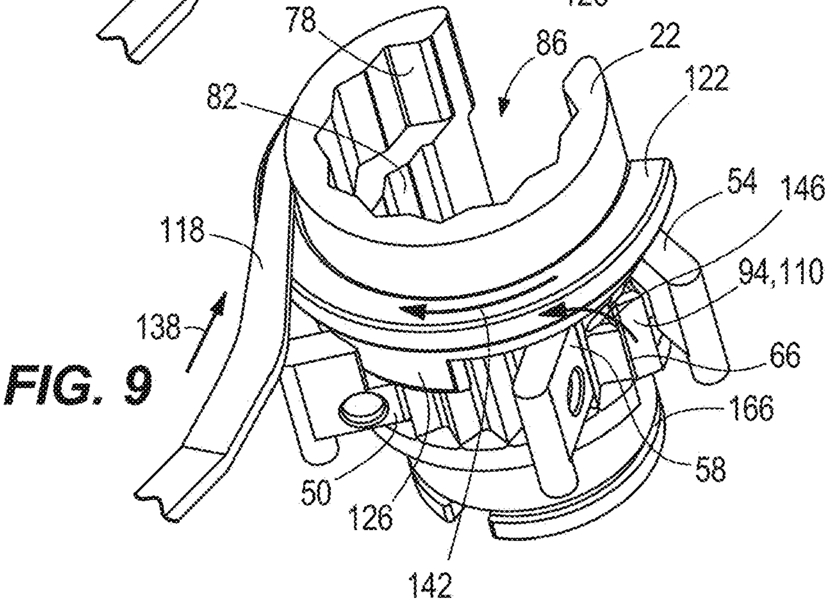
FIG. 9 is a perspective view of the ratchet tool of FIG. 1, with portions removed and a collar in an operating position.

However, when the home actuator 114 is moved to the home position, the linkage 118 is pulled by the home actuator 114 such that the collar 122 is rotated (as indicated by arrow 130) to a home position shown in FIG. 8. In the home position of the collar 122, the blocking member 126 is rotationally aligned with non-selective pawl 58, thus pushing the non-selective pawl 58 away (as indicated by arrow 134) from the outer toothed surface 66 of the output member 22, such that the non-selective pawl 58 is inhibited from engaging with the outer toothed surface 66 of the output member 22. As shown in FIG. 9, when the home actuator 114 is moved back to the operating position, the linkage 118 is pushed (as indicated by arrow 138) back to its operating position, and the collar 122 is rotated (as indicated by arrow 142) back to its operating position. Once the blocking member 126 is no longer rotationally aligned with the non-selective pawl 58, the non-selective pawl 58 is biased back into engagement with the outer toothed surface 66 of the output member, as indicated by arrow 146. In some embodiments, the home actuator 114 may be biased to its operating position.

Figure 10:
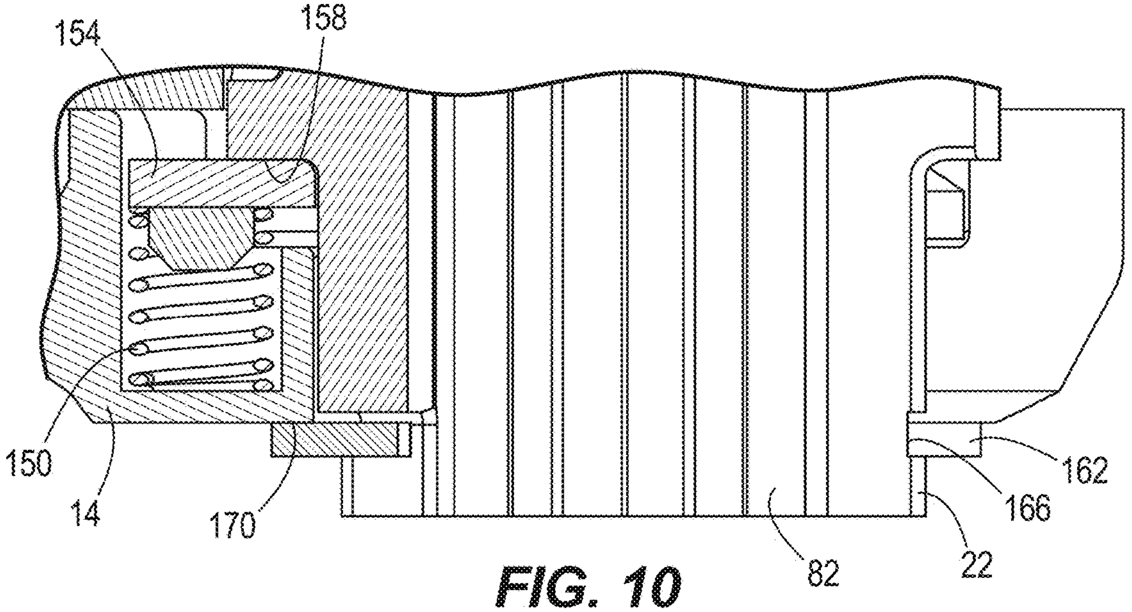
FIG. 10 is an enlarged, cross-sectional view of the ratchet tool of FIG. 1.
Figure 11:
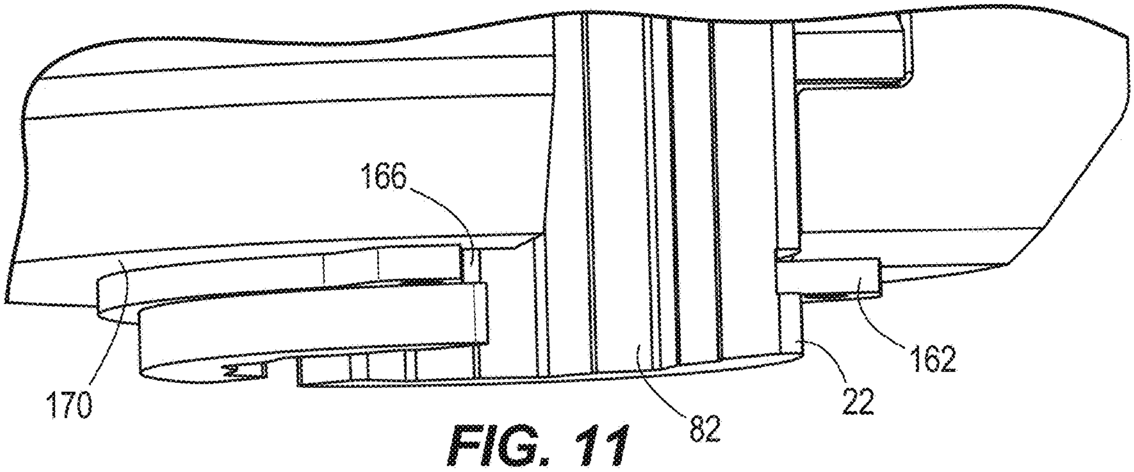
FIG. 11 is an enlarged, perspective view of the ratchet tool of FIG. 1.
Figure 12:
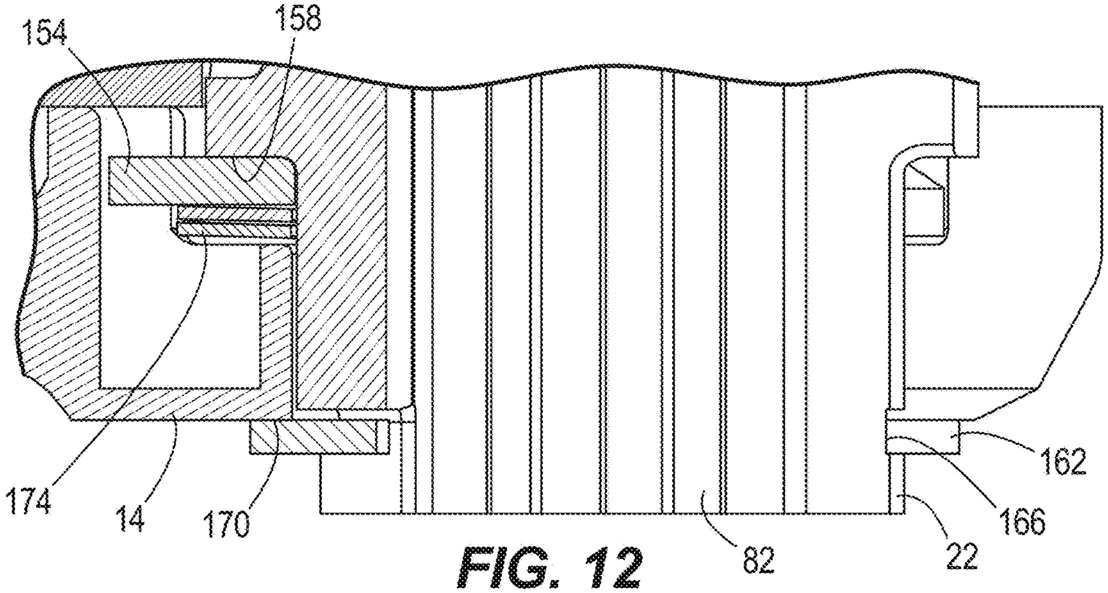
FIG. 12 is an enlarged, cross-sectional view of a ratchet tool according to another embodiment of the invention.

As shown in FIG. 10, a plurality of compression springs 150 (only one shown) are arranged within the housing 14 and configured to bias a friction ring 154 against a ledge 158 of the output member 22. However, a retaining ring 162 (FIG. 11) arranged within a circumferential groove 166 of the output member 22 and abutted against a side 170 of the housing 14 inhibits the output member 22 from being ejected from the housing 14. Thus, the ledge 158 of the output member 22 experiences continuous friction by virtue of the friction ring 154 being in constant contact with the ledge 158. As shown in FIG. 12, in a different embodiment, instead of a plurality of compression springs 150 as in the embodiment of FIGS. 1-11, a wave spring 174 is arranged between the housing 14 and the friction ring 154 to bias the friction ring 154 against the ledge 158 of the output member 22.

In operation, the ratchet tool 10 may be used for adjusting a nut on an intermediate portion of a threaded rod, in a first direction along the rod. Specifically, while the output member 22 is in the home position, the ratchet tool 10 can be inserted onto the rod by inserting the rod through the yoke aperture 48 and output member aperture 86, until the rod is received in the inner opening 70 of the output member 22. Once the rod is received in the inner opening 70 and aligned with the longitudinal axis 74, the output member 22 is moved along the longitudinal axis 74 and the rod until, for example, the second end section 82 engages the nut. After ensuring that the home actuator 114 is in the operating position, the motor 26 of the drive mechanism 18 is activated. Activation of the motor 26 causes the crankshaft 34 to rotate the drive bushing 36, which causes the yoke 42 to pivot in a reciprocating manner relative to the housing 14.

Initially, as the yoke 42 is undergoing a “driving” pivot motion (pivoting counterclockwise as viewed in FIG. 2 about the longitudinal axis 74), at least one of the three pawls, i.e., the first and second selective pawls 50, 54 and the non-selective pawl 58, engage the toothed surface 66 of the output member 22. As noted above, if at a certain moment during the “driving” pivot motion, the first selectively-toothed section 90 of the outer toothed section 66 is rotationally aligned with the first selective pawl 50, the first selective pawl 50 is not capable of transferring torque to the output member 22 via the toothed surface 66. As also noted above, if at a certain moment during the “driving” pivot motion, the second selectively-toothed section 94 of the outer toothed section 66 is rotationally aligned with the second selective pawl 54, the second selective pawl 54 is not capable of transferring torque to the output member 22 via the toothed surface 66.

However, if at a certain moment during the “driving” pivot motion, the first selectively-toothed section 90 is rotationally aligned with either of the second selective pawl 54 and the non-selective pawl 58, the second selective pawl 54 and the non-selective pawl 58 can transfer torque to the output member 22, because the second selective pawl 54 and the non-selective pawl 58 engage with the first toothed section 102, which is longitudinally aligned with both of the second selective pawl 54 and the non-selective pawl 58, with respect to the longitudinal axis 74. Likewise, if at a certain moment during the “driving” pivot motion, the second selectively-toothed section 94 is rotationally aligned with either of the first selective pawl 50 and the non-selective pawl 58, the first selective pawl 50 and the non-selective pawl 58 can transfer torque to the output member 22, because the first selective pawl 50 and the non-selective pawl 58 engage with the second toothed section 110, which is longitudinally aligned with both of the first selective pawl 50 and the non-selective pawl 58, with respect to the longitudinal axis 74.

If at a certain moment during the “driving” pivot motion, the output member 22 reaches the “home” position, the first selectively-toothed section 90 is rotationally aligned with the first selective pawl 50 and the second selectively-toothed section 94 is simultaneously rotationally aligned with the second selective pawl 54, such that only the non-selective pawl 58 will transfer torque to the output member 22 via the toothed section 66. If at a certain moment during the “driving” pivot motion of the yoke 42, the output member aperture 86 is rotationally aligned with the non-selective pawl 58 (and thus not engaged with the outer toothed surface 66), neither of the first or second selectively-toothed sections 90, 94 of the toothed surface 66 will be respectively rotationally aligned with the first or second selective pawls 50, 54, such that the first or second selective pawls 50, 54 can continue transferring torque to output member 22 via the outer toothed surface 66. Thus, during the “driving” pivot motion, torque is transferred from the yoke 42 to the output member 22 by at least one of the three pawls, i.e. the first and second selective pawls 50, 54, and the non-selective pawl 58, causing the output member 22 to rotate counterclockwise about the longitudinal axis 74, as viewed in FIG. 2.

As the crankshaft 34 continues to rotate the drive bushing 36, the yoke 42 undergoes a “ratcheting” pivot motion (pivoting clockwise as viewed in FIG. 2 about the longitudinal axis 74), causing all three pawls, i.e., the first and second selective pawls 50, 54, and the non-selective pawl 58, to ratchet back across the toothed surface 66 of the output member 22, thus not transferring any torque to the output member 22. It is worth noting that when the first selectively-toothed section 90 is rotationally aligned with the first selective pawl 50 during the “ratcheting” motion of the yoke 42, the first selective pawl 50 does not “ratchet”

back across the toothed surface 66; rather the first selective pawl 50 merely slides against the first non-toothed section 98. It is also worth noting that when the second selectively-toothed section 94 is rotationally aligned with the second selective pawl 54 during the "ratcheting" motion of the yoke 42, the second selective pawl 54 does not "ratchet" back across the toothed surface 66; rather the second selective pawl 54 merely slides against the second non-toothed section 106. In addition to the pawls 50, 54, 58 not transferring torque to the output member 22 during the "ratcheting" pivot motion of the yoke 42, the output member 22 is also inhibited from rotating via the friction ring 154 creating friction against the ledge 158 of the output member 22.

After completing the "ratcheting" pivot motion, the yoke 42 continues to perform a series of subsequent "driving" and "ratcheting" pivot motions to move the nut along the threaded rod in the first direction via the output member 22. Once the nut has been moved along a sufficient distance in the first direction, the motor 26 is deactivated and the output member 22 is moved along the longitudinal axis 74 and the rod until the nut is removed from the output member 22. At this point, the output member 22 may need to be removed from the threaded rod, but may be blocked if the output member 22 is not in the "home" position, and thus, the output member aperture 86 is not aligned with the yoke aperture 48, such that there is no passage allowing for the output member 22 to be removed from the rod.

Thus, the home actuator 114 must be moved to the home position, thereby moving the collar 122 to its home position, such that the non-selective pawl 58 is blocked from engaging the outer toothed surface 66 of the output member 22 by the blocking member 126. The motor 26 is then reactivated, causing the yoke 42 to perform a series of subsequent "driving" and "ratcheting" pivot motions, until the output member 22 is rotated to the "home" position. As noted above, when the output member 22 is in the "home" position, the first selectively-toothed section 90 is rotationally aligned with first selective pawl 50 and the second selectively-toothed section 94 is rotationally aligned with the second selective pawl 54. Thus, neither of the first or second selective pawls 50, 54 is capable of transferring torque to the output member 22. And, because the non-selective pawl 58 is inhibited from engaging with and transferring torque to the output member 22 by the blocking member 126, the output member 22 stops rotating even while the yoke 42 continues to reciprocate. The motor 26 is then subsequently deactivated, leaving the output member 22 in the home position. Because the output member aperture 86 is re-aligned with the yoke aperture 48, a passage is opened for the rod to be laterally removed from the output member 22, thus removing the ratcheting power tool 10 from the rod.

In operation, when an operator wishes to move the nut in a second direction along the rod that is opposite the first direction, the ratchet tool 10 may be vertically flipped and nut may be arranged in the output member 22 as discussed above. Then, the motor 26 may be activated and the "driving" and "ratcheting" motions of the yoke 42 above may be repeated until the nut has been moved a sufficient amount along the rod in the second direction.

Figure 13:
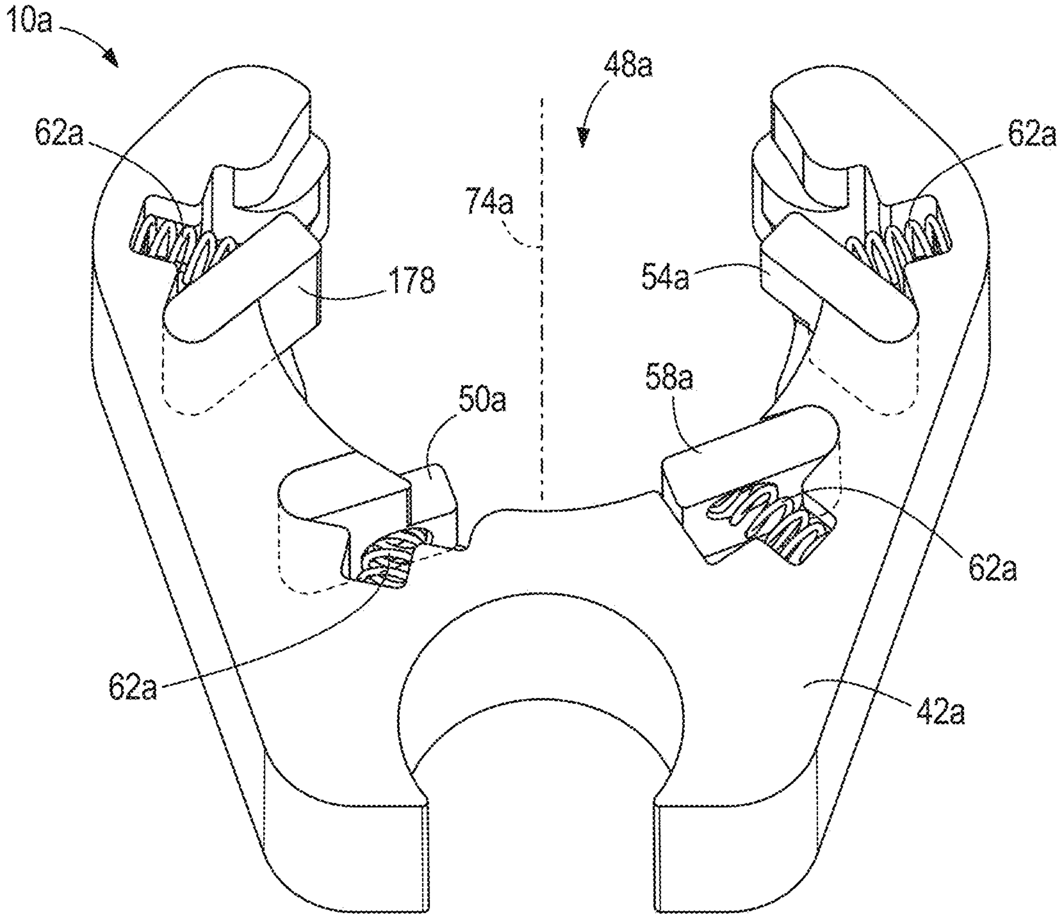
FIG. 13 is a perspective view of a yoke of the ratchet tool of FIG. 1, with portions removed, according to another embodiment of the invention.
Figure 14:
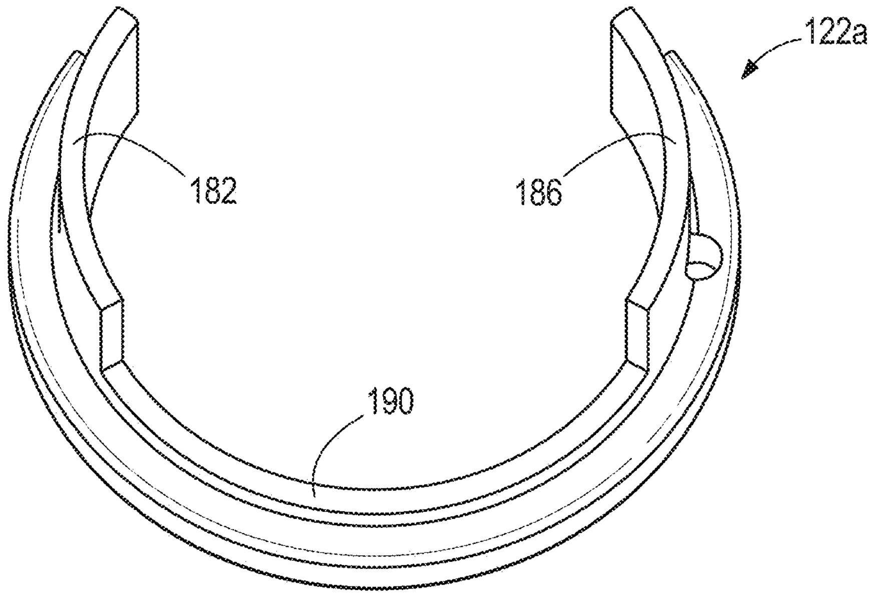
FIG. 14 is a perspective view of a collar of the ratchet tool of FIG. 1, according to the embodiment of FIG. 13.

FIGS. 13 and 14 illustrate a different embodiment of a ratchet tool 10*a*. The ratchet tool 10*a* is the same as the ratchet tool 10 of FIGS. 1-11, with like parts having the same annotation with the suffix "a" added, except for the three differences noted below.

The first difference is that the non-selective pawl 58*a* is a first non-selective pawl 58*a*, and the orientation of the first non-selective pawl 58*a* is opposite that of the orientation of the non-selective pawl 58, such that when the yoke 42*a* is undergoing a second pivot motion (pivoting clockwise as viewed in FIG. 13 about the longitudinal axis 74*a*) and the first non-selective pawl 58*a* is engaged against the toothed surface 66, the first non-selective pawl 58*a* transfers torque to the output member 22 via the toothed surface 66, causing the output member 22 to rotate in the second (clockwise) direction about the longitudinal axis 74*a*.

The second difference is that the ratchet tool 10*a* includes a second non-selective pawl 178 having the same orientation as the first non-selective pawl 58*a*, Thus, when the yoke 42*a* is undergoing the second pivot motion (pivoting clockwise as viewed in FIG. 13 about the longitudinal axis 74*a*) and the second non-selective pawl 178 is engaged against the toothed surface 66*a*, the second non-selective pawl 178 transfers torque to the output member 22*a* via the toothed surface 66*a*, causing the output member 22*a* to rotate in the second (clockwise) direction about the longitudinal axis 74*a*.

The third difference is that that the collar 122*a* includes first and second blocking portions 182, 186 and an opening 190 therebetween. When the collar 122*a* is in the operating position, the first blocking portion 182 is positioned between the first selective pawl 50*a* and the toothed surface 66*a*, the second blocking portion 186 is positioned between the second selective pawl 54*a* and the toothed surface 66*a*, the opening 190 is positioned adjacent the first non-selective pawl 58*a*, and no portion of the collar 122*a* is arranged in front of the second non-selective pawl 178, such that the first and second selective pawls 50*a*, 54*a* are inhibited from engaging against and transferring torque to the output member 22*a* via the toothed surface 66*a*, and the first and second non-selective pawls 58*a*, 178 are engaged against and capable of transferring torque to the output member 22*a* via the toothed surface 66*a*. When the collar 122*a* is in the home position, the first blocking portion 182 is positioned between the second non-selective pawl 178 and the toothed surface 66*a*, the second blocking portion 186 is positioned between the first non-selective pawl 58*a* and the toothed surface 66*a*, the opening 190 is positioned adjacent the first selective pawl 50*a*, and no portion of the collar 122*a* is arranged in front of the second selective pawl 54*a*, such that the first and second non-selective pawls 58*a*, 178 are inhibited from engaging against and transferring torque to the output member 22*a* via the toothed surface 66*a*, and the first and second selective pawls 50*a*, 54*a* are engaged against and capable of transferring torque to the toothed surface 66*a*.

These three differences result in the ratchet tool 10*a* functioning slightly differently than the ratchet tool 10, as explained below.

In operation of the ratchet tool 10*a*, the ratchet tool 10*a* may be used for adjusting a nut on an intermediate portion of a threaded rod, in a first direction along the rod. Specifically, while the output member 22 is in the home position, the ratchet tool 10*a* can be inserted onto the rod by inserting the rod through the yoke aperture 48*a* and output member aperture 86, until the rod is received in the inner opening 70 of the output member 22. Once the rod is received in the inner opening 70 and aligned with the longitudinal axis 74*a*, the output member 22 is moved along the longitudinal axis 74*a* and the rod until, for example, the second end section 82 engages the nut. After ensuring that the home actuator 114 is in the operating position, the motor 26 of the drive mechanism 18 is activated. Activation of the motor 26 causes the crankshaft 34 to rotate the drive bushing 36, which causes the yoke 42*a* to pivot in a reciprocating manner relative to the housing 14.

Initially, as the yoke 42*a* is undergoing a first pivot motion (pivoting counterclockwise as viewed in FIG. 13 about the longitudinal axis 74), because the first and second selective pawls 50*a*, 54*a* are respectively blocked by the first and second blocking portions 182, 186, neither of the first and second selective pawls 50*a*, 54*a* engage against the toothed surface 66*a*. Also, although the first and second non-selective pawls 58*a*, 178 are engaged against the toothed surface 66*a*, because of their respective orientations, both of the first and second non-selective pawls 58*a*, 178 simply ratchet across the toothed surface 66*a* as the yoke 42*a* is undergoing the first pivot motion. Thus, during the first pivot motion, no torque is transferred to the toothed surface 66*a* and the output member 22*a* remains in place.

As the crankshaft 34 continues to rotate the drive bushing 36, the yoke 42*a* undergoes a second pivot motion (pivoting clockwise as viewed in FIG. 13 about the longitudinal axis 74*a*). Because the first and second selective pawls 50*a*, 54*a* are respectively blocked by the first and second blocking portions 182, 186, neither of the first and second selective pawls 50*a*, 54*a* engage against the toothed surface 66. Also, because the yoke 42*a* is undergoing the second pivot motion, because of their respective orientations, both of the first and second non-selective pawls 58*a*, 178 transfer torque to the output member 22 via the toothed surface 66. Thus, during the second pivot motion while the home actuator 114 and the collar 122*a* are in their respective operating positions, the output member 22 is caused to rotate in the second (clockwise) direction about the longitudinal axis 74*a*, thus moving the nut along the threaded rod in the first direction.

After completing the second pivot motion, the yoke 42*a* continues to perform a series of subsequent first and second pivot motions to move the nut along the threaded rod in the first direction via the output member 22*a*. Once the nut has been moved along a sufficient distance in the first direction, the motor 26*a* is deactivated and the output member 22*a* is moved along the longitudinal axis 74*a* and the rod until the nut is removed from the output member 22*a*. At this point, the output member 22*a* may need to be removed from the threaded rod, but may be blocked if the output member 22*a* is not in the home position, and thus, the output member aperture 86*a* is not aligned with the yoke aperture 48*a*, such that there is no passage allowing for the output member 22*a* to be removed from the rod.

Thus, the home actuator 114*a* must be moved to the home position, thereby moving the collar 122*a* to its home position, such that the first blocking portion 182 is positioned between the second non-selective pawl 178 and the toothed surface 66*a*, the second blocking portion 186 is positioned between the first non-selective pawl 58*a* and the toothed surface 66*a*, the opening 190 is positioned adjacent the first selective pawl 50*a*, and no portion of the collar 122*a* is arranged in front of the second selective pawl 54*a*, such that the first and second non-selective pawls 58*a*, 178 are inhibited from engaging against and transferring torque to the output member 22*a* via the toothed surface 66*a*, and the first and second selective pawls 50*a*, 54*a* are engaged against and capable of transferring torque to the toothed surface 66*a*. The motor 26*a* is then reactivated, causing the yoke 42*a* to perform a series of subsequent first and second pivot motions, until the output member 22*a* is rotated to the home position, as described below.

Specifically, as the yoke 42*a* is undergoing the first pivot motion (pivoting counterclockwise as viewed in FIG. 13 about the longitudinal axis 74), because the first and second non-selective pawls 58*a*, 178 are respectively blocked by the second and first blocking portions 186, 182 of the collar 122*a*, neither of the first and second non-selective pawls 58*a*, 178 engage against the toothed surface 66*a*. However, because the first and second selective pawls 50*a*, 54*a* are engaged against the toothed surface 66*a*, and because of their respective orientations, the first and second selective pawls 50*a*, 54*a* transfer torque to the output member 22*a* via the toothed surface 66*a*. Thus, during the first pivot motion while the home actuator 114*a* and the collar 122*a* are in their respective home positions, the output member 22*a* is caused to rotate in the first (counterclockwise) direction about the longitudinal axis 74*a*.

As the crankshaft 34*a* continues to rotate the drive bushing 36*a*, the yoke 42*a* undergoes the second pivot motion (pivoting clockwise as viewed in FIG. 13 about the longitudinal axis 74*a*). Although the first and second selective pawls 50*a*, 54*a* are engaged against the toothed surface 66*a*, because of their respective orientations, both of the first and second selective pawls 50*a*, 54*a* simply ratchet across the toothed surface 66*a* as the yoke 42*a* is undergoing the second pivot motion. Thus, during the second pivot motion, no torque is transferred to the toothed surface 66*a*, and the output member 22*a* remains in place.

After completing the second pivot motion, the yoke 42*a* continues to perform a series of subsequent first and second pivot motions until the output member 22*a* is rotated to the home position. Once the output member 22*a* is in the home position, neither of the first or second selective pawls 50*a*, 54*a* is capable of transferring torque to the output member 22*a* even when the yoke 42*a* is undergoing the first pivot motion. Thus, the output member 22*a* stops rotating even while the yoke 42 continues to reciprocate. The motor 26*a* is then subsequently deactivated, leaving the output member 22*a* in the home position. Because the output member aperture 86 is re-aligned with the yoke aperture 48*a*, a passage is opened for the rod to be laterally removed from the output member 22*a*, thus removing the ratcheting power tool 10*a* from the rod.

In operation, when an operator wishes to move the nut in a second direction along the rod that is opposite the first direction, the ratchet tool 10*a* may be vertically flipped and nut may be arranged in the output member 22*a* as discussed above. Then, the motor 26*a* may be activated and the first and second pivot motions of the yoke 42*a* described above may be repeated until the nut has been moved a sufficient distance along the rod in the second direction.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered ratchet tool comprising:

a housing;

an output member having an inner opening, an outer toothed surface, and an output member aperture extending through the output member to communicate with the inner opening, the output member moveable to a home position;

a drive mechanism for driving the output member, the drive mechanism including a yoke in which the output member is arranged, the yoke having a yoke aperture;

a first selective pawl in the yoke that is biased toward the outer toothed surface of the output member;

a second selective pawl in the yoke that is biased toward the outer toothed surface of the output member; and a non-selective pawl in the yoke that is biased toward the outer toothed surface of the output member;

wherein the outer toothed surface includes a first partially-toothed section and a second partially-toothed section, wherein when the first partially-toothed section is rotationally aligned with the first selective pawl, the first selective pawl is incapable of transferring torque to the output member, wherein when the second partially-toothed section is rotationally aligned with the second selective pawl, the second selective pawl is incapable of transferring torque to the output member, and wherein when the output member is in the home position, the first partially-toothed section is rotationally aligned with the first selective pawl, the second partially-toothed section is rotationally aligned with the second selective pawl, and the output member aperture is aligned with the yoke aperture.

2. The powered ratchet tool of claim 1, wherein the yoke further comprises a plurality of springs configured to bias each of the first selective pawl, the second selective pawl, and the non-selective pawl toward the outer toothed surface in a driving direction.

3. The powered ratchet tool of claim 1, wherein the non-selective pawl comprises a width ($W_{NPS}$) and the outer toothed surface comprises a width ($W_{TS}$), and wherein the width of the non-selective pawl ($W_{NPS}$) is about equal to the width ($W_{TS}$) of the outer toothed surface.

4. The powered ratchet tool of claim 3, wherein the first selective pawl and the second selective pawl each comprise a width ($W_{SP}$), and wherein the width ($W_{SP}$) of the first and second selective pawls is less than the width ($W_{TS}$) of the outer toothed surface.

5. The powered ratchet tool of claim 1, wherein the first partially-toothed section further comprises a first non-toothed section longitudinally aligned with the first selective pawl and a first toothed section not longitudinally aligned with the first selective pawl.

6. The powered ratchet tool of claim 5, wherein the second partially-toothed section further comprises a second non-toothed section longitudinally aligned with the second selective pawl and a second toothed section not longitudinally aligned with the second selective pawl.

7. The powered ratchet tool of claim 1, wherein the output member further comprises a ledge and a groove configured to receive a retaining ring, wherein the retaining ring abuts a side of the housing, and wherein a plurality of springs arranged within the housing bias a friction ring against the ledge.

8. The powered ratchet tool of claim 1, further comprising a blocking member that when the output member is in the home position, the blocking member inhibits the non-selective pawl from engaging with the outer toothed surface of the output member.

9. A powered ratchet tool comprising:

a housing;

an output member having an inner opening, an outer toothed surface, and an output member aperture extending through the output member to communicate with the inner opening;

a drive mechanism for driving the output member, the drive mechanism including a yoke in which the output member is arranged, the yoke having a yoke aperture;

a selective pawl in the yoke that is biased toward the outer toothed surface of the output member;

a non-selective pawl in the yoke that is biased toward the outer toothed surface of the output member; and a blocking member configured to move between an operating position, in which the non-selective pawl is engaged with the outer toothed surface of the output member, and a home position, in which the blocking member inhibits the non-selective pawl from engaging with the outer toothed surface of the output member, wherein the outer toothed surface includes a partially-toothed section, wherein when the partially-toothed section is rotationally aligned with the selective pawl, the selective pawl is incapable of transferring torque to the output member, and wherein when the output member is in the home position, the partially-toothed section is rotationally aligned with the selective pawl, and the output member aperture is aligned with the yoke aperture.

10. The powered ratchet tool of claim 9, wherein when the blocking member is in the operating position, at least one of the selective pawl and the non-selective pawl is configured to transfer torque to the output member.

11. The powered ratchet tool of claim 9, wherein the partially-toothed section further comprises a non-toothed section longitudinally aligned with the selective pawl and a toothed section not longitudinally aligned with the selective pawl.

12. A powered ratchet tool comprising:

a housing;

an output member having an inner opening and an outer toothed surface;

a drive mechanism for driving the output member, the drive mechanism including a yoke in which the output member is arranged;

a first selective pawl in the yoke that is biased toward the outer toothed surface of the output member;

a second selective pawl in the yoke that is biased toward the outer toothed surface of the output member;

a non-selective pawl in the yoke that is biased toward the outer toothed surface of the output member; and a blocking member configured to move between an operating position, in which the non-selective pawl is engaged with the outer toothed surface of the output member, and a home position, in which the blocking member inhibits the non-selective pawl from engaging with the outer toothed surface of the output member, wherein the outer toothed surface includes a first partially-toothed section and a second partially-toothed section, wherein when the first partially-toothed section is rotationally aligned with the first selective pawl, the first selective pawl is incapable of transferring torque to the output member, wherein when the second partially-toothed section is rotationally aligned with the second selective pawl, the second selective pawl is incapable of transferring torque to the output member, and wherein when the output member is in the home position, the first partially-toothed section is rotationally aligned with the first selective pawl, and the second partially-toothed section is rotationally aligned with the second selective pawl.

13. The powered ratchet tool of claim 12, wherein when the blocking member is in the operating position, at least one of the first selective pawl, the second selective pawl, and the non-selective pawl is configured to transfer torque to the output member.

14. The powered ratchet tool of claim 12, wherein the yoke further comprises a plurality of springs configured to bias each of the first selective pawl, the second selective pawl, and the non-selective pawl toward the outer toothed surface in a driving direction.

15. The powered ratchet tool of claim 12, wherein the first partially-toothed section further comprises a first non-toothed section longitudinally aligned with the first selective pawl and a first toothed section not longitudinally aligned with the first selective pawl.

16. The powered ratchet tool of claim 12, wherein the second partially-toothed section further comprises a second non-toothed section longitudinally aligned with the second selective pawl and a second toothed section not longitudinally aligned with the second selective pawl.

17. The powered ratchet tool of claim 12, wherein when the blocking member is in the operating position, the first partially-toothed section is longitudinally aligned with the second selective pawl and the non-selective pawl.

18. The powered ratchet tool of claim 12, wherein when the blocking member is in the operating position, the second partially-toothed section is longitudinally aligned with the first selective pawl and the non-selective pawl.

19. The powered ratchet tool of claim 12, wherein the output member includes an output member aperture and the yoke includes a yoke aperture, and wherein when the output member is in the home position, the output member aperture is aligned with the yoke aperture.

* * * * *